United States Patent [19]
Aoyama

[11] Patent Number: 5,678,051
[45] Date of Patent: Oct. 14, 1997

[54] TRANSLATING APPARATUS WITH SPECIAL DISPLAY MODE FOR SUPPLEMENTED WORDS

[75] Inventor: Shoichi Aoyama, Katano, Japan

[73] Assignee: Matsushita Electric Industrial C., Ltd., Osaka-fu, Japan

[21] Appl. No.: 370,537

[22] Filed: Jan. 9, 1995

Related U.S. Application Data

[63] Continuation-in-part of Ser. No. 173,678, Dec. 22, 1993.

[30] Foreign Application Priority Data

Dec. 24, 1992 [JP] Japan .................................. 4-343930

[51] Int. Cl.⁶ .................................................... G06F 17/28
[52] U.S. Cl. ..................... 395/752; 395/754; 395/755
[58] Field of Search ........................ 364/419.01, 419.02, 364/419.03, 419.04, 419.05, 419.16; 395/751, 752, 755, 754

[56] References Cited

U.S. PATENT DOCUMENTS

| | | | |
|---|---|---|---|
| 4,412,305 | 10/1983 | Yoshida | 364/419.04 |
| 4,502,128 | 2/1985 | Okajima et al. | 364/419.08 |
| 4,586,160 | 4/1986 | Amano et al. | 364/419.02 |
| 4,635,199 | 1/1987 | Muraki | 364/419.02 |
| 4,641,264 | 2/1987 | Nitta et al. | 364/419.04 |
| 4,706,212 | 11/1987 | Toma | 364/419.02 |
| 4,864,503 | 9/1989 | Tolin | 364/419.02 |
| 4,866,670 | 9/1989 | Adachi et al. | 364/419.05 |
| 5,023,786 | 6/1991 | Kugimiya et al. | |
| 5,088,038 | 2/1992 | Tanaka et al. | 364/419.02 |
| 5,311,429 | 5/1994 | Tominaga | 364/419.01 |

*Primary Examiner*—Gail O. Hayes
*Assistant Examiner*—Gita D. Shingala
*Attorney, Agent, or Firm*—Price, Gess & Ubell

[57] ABSTRACT

The translator of the present invention includes the following units. A unit for analyzing semantic structure of a received source language sentence through a morphological and syntactic analyses, a unit for transforming the semantic structure of the source language sentence into that of the target language by determining target language words equivalent to individual words composing the source language sentence while, in case of need, supplementing a word to conform to the grammar of the target language, and a unit for generating a target language sentence by rearranging the determined words in conformance with the semantic structure of the target language. The translator further includes a unit for holding various display modes applied to a word supplemented in order to display it distinguishable from the other words composing the target language sentence.

20 Claims, 23 Drawing Sheets

(" kare/wa/sono/kuruma/wo/nusunda/ageku/、/uriharatta/。/ ")

After he stole the car, he sold it off.
↑   ↑   ↑   ↑   ↑   ↑   ↑   ↑
1   5   10  15  20  25  30  35

| Japanese | meaning<br>word class<br>sub word class | その<br>non-conjugative adjective |
|---|---|---|
| English | meaning<br>word class<br>sub word class<br>character<br>meaning code | it<br>pronoun<br><br>it<br>EE2 |
| structure | node number<br>parent node number | 98<br>83 |

Fig.12
| structure | node numbers | 96 | 98 | * |
| --- | --- | --- | --- | --- |
| | parent node numbers | 83 | 83 | * |
| display | display start positions | 25 | 33 | * |
| | display end positions | 26 | 34 | * |
40
Fig.13A
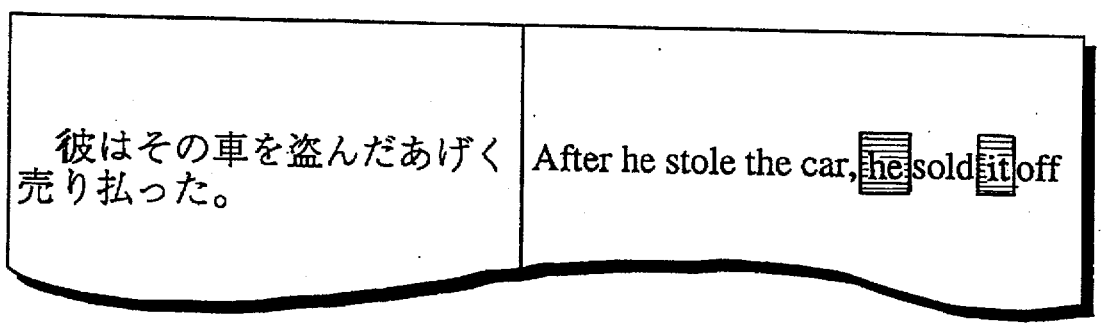
Fig.13B
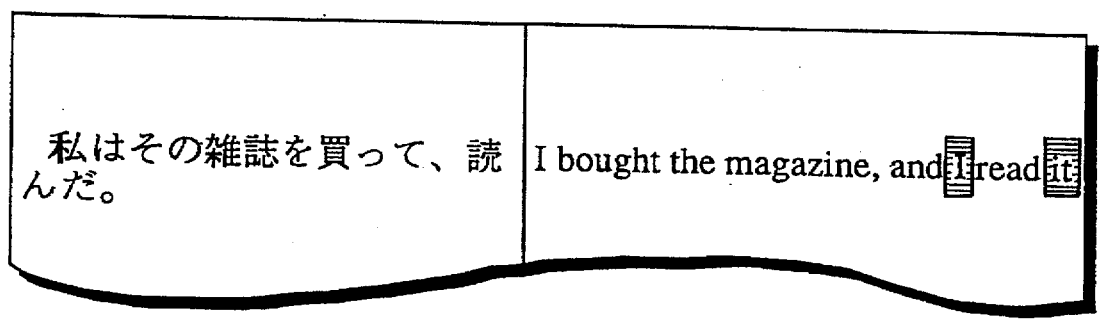

| | | 31 |
|---|---|---|
| Japanese | meaning<br>word class<br>sub word class | その<br>non-conjugative adjective |
| English | meaning<br>word class<br>sub word class<br>character<br>meaning code | it<br>pronoun<br><br>it<br>EE2 |
| structure | node number<br>parent node number | 98<br>83 |
| display | supplement identification marks | 1 |
| | display start positions<br>display end positions | 33<br>34 |

(32 labels the lower display section)

(かれ/が/くる/ので/、/つくえ/を/うごかします/。/)
(kare/ga/kuru/node/、/tsukue/wo/ugokashimasu/。/)

Fig. 22

| | | | 221 |
|---|---|---|---|
| structure | node number | 216 | * |
| | parent node number | 212 | * |
| supplementing types | | 2 | * |
| display | display start positions | 19 | * |
| | display end positions | 20 | * |

222 — structure
223 — supplementing types
224 — display

English phrase structure

彼が来るので、机を動かします。Because he comes, moves the desk.

241　　　242

TRANSLATING APPARATUS WITH SPECIAL DISPLAY MODE FOR SUPPLEMENTED WORDS

This application is a continuation in part application of U.S. Ser. No. 08/173,678, filed on Dec. 22, 1993, for A TRANSLATING APPARATUS WITH SPECIAL DISPLAY MODE FOR SUPPLEMENTED WORDS.

BACKGROUND OF THE INVENTION (1) Field of the Invention

This invention relates to an apparatus for translating a language as a source language into another language as a target language.

(2) Description of the Background Art

Technology on artificial intelligence has been applied and put to practical use in various industrial fields. Translators of various types have been achieved by applying natural language processing systems as the artificial intelligence.

For example, U.S. Pat. No. 5,088,038 discloses a machine translation system where the process for choosing appropriate words for translation is composed of two steps. In the first step if an appropriate target language word could not be determined owing to the broadness of a source language word, the word can be properly translated in the second step.

The system shows the two-step process of choosing an appropriate Japanese word equivalent to English word "paper" as follows.

(1) "You have this paper."
(2) "I wrote this paper."

In the sentence (1), there are two Japanese candidates for the word "paper": one is "Kami" which means a sheet of a material to write or print on and the other is "ronbun", which means a dissertation. An appropriate Japanese word equivalent to the "paper" cannot be determined from the sentence itself alone. However, in the sentence (2), only "ronbun" (dissertation) can be considered an appropriate word. This two-step process of choosing "ronbun" (dissertation) for "paper" is stored according to this machine translation system, and as a result, "ronbun" (dissertation) can be chosen in the first step next time.

Another machine translation system is disclosed in U.S. Pat. No. 4,864,503. The feature of this system is to put an artificial language such as Esperanto as an intermediate language. The disclosure includes a description on the conjugation of pronouns, depending on their cases such as "he" and "him", or "she" and "her" (column 6, lines 21–25).

The disclosure also includes a description on the position of a supplemented word (column 4, lines 43–53), which includes the art of assigning numbers to every sentence contained in a file.

Besides these prior arts, the following is another prior art which is directly related to the present invention.

FIG. 1 shows a block diagram of a conventional translator provided with a reception unit 11, a source language sentence analysis unit 12, a transformation unit 13, a target language sentence generation unit 14, and a display unit 15.

FIG. 2 shows a flowchart depicting a series of operations executed by each of the units of FIG. 1.

First, the reception unit 11 receives a source language sentence (Step 110).

The source language sentence analysis unit 12 applies morphological and semantic analyses to the source language sentence (Steps 120 and 130).

The transformation unit 13 transforms the semantic structure of the source language sentence into that of the target language, and determines equivalent target language words (Step 140).

The target language sentence generation unit 14 generates a target language sentence by rearranging the words determined, in conformation to the syntax of the target language (Step 150).

The display unit 15 displays both the original source language sentence and the target language sentence thus generated (Step 160).

FIG. 3 shows a Japanese language sentence as the source language sentence and an English equivalent as the target language sentence applied to the translator.

As in the case shown in FIG. 3, Japanese has much more cases that the subject and/or the object of a sentence is omitted as compared with European languages such as English. Such omissions of words do not make Japanese conversation or writing ambiguous at all. Consequently, when Japanese translated into English, any omitted subject or object must be supplemented in accordance with English grammar. Thus, the transformation unit 13 of the translator must provide a target language sentence with a supplemented word which corresponds to a word omitted in a source language sentence. Here, a supplemented word means a word which corresponds to a subject or an object unnecessary to exhibit in a source language sentence but necessary in a target language sentence.

In the example shown in FIG. 3, the words "he" and "it" are supplemented. Although they are both pronouns, a noun also can be a supplemented word.

However, translators developed so far have not achieved a standard of always determining most appropriate words to be supplemented because supplemented words are determined by a simple analysis of the semantic construction. In the case of the above sentence, a correct translation has been obtained as a result that the transformation unit 13 has determined an appropriate word accidentally; however, the transformation unit 13 is not always successful. Consequently, verifying the accuracy of each supplemented word is an important task for users.

Meanwhile, the supplemented words are displayed in the same mode as the other words composing the sentence, so that the users cannot pick out the supplemented words immediately. This forces the users to check every word in the entire translation.

SUMMARY OF THE INVENTION

A first object of this invention, in view of the forgoing problems, to provide a translator that displays words supplemented in the course of translation in a special mode so as to be distinguishable from the other words in the generated sentence.

A second object of this invention is to provide a translator that displays the supplemented words in a special mode to indicate whether each of the supplemented words is the subject or the object of a sentence, in order to simplify the checking of the supplemented words.

The translator of this invention is provided with the following units:

A reception unit for receiving a source language sentence, a source language sentence analysis unit for analyzing semantic structure of the received source language sentence through a morphological and syntactic analyses, a transformation unit for transforming the semantic structure of the source language sentence received into that of the target language by determining target language words equivalent to individual words composing the source language sentence while, in case of need, supplementing a word to conform to the grammar of the target language, and a target language sentence generation unit for generating a target language sentence by rearranging the determined words in conformance with the semantic structure of the target language.

The translator further includes a supplementary word storage unit for holding information on a word supplemented and a supplementary word display mode storage unit for holding various display modes applied to a word supplemented in order to display it distinguishably from the other words composing the target language sentence.

Also, the above-mentioned transformation unit may have an additional function of generating an information table showing semantic structure of each supplemented word.

The second object can be achieved by an apparatus for translating a Japanese language sentence into a target language sentence comprising the following units:

- a reception unit for receiving a Japanese language sentence;
- a Japanese analysis unit for analyzing semantic structure of the Japanese language received by the reception unit;
- a transformation unit for transforming the analyzed semantic structure to semantic structure of the target language by determining target language words equivalent to individual words composing the Japanese language sentence while, in case of need, supplementing a word that is omitted in the Japanese language sentence but is necessary in the target language so as to conform to grammar of the target language;
- a generation unit for generating the target language sentence by rearranging the determined words of the target language into a phrase structure in conformance with the semantic structure of the target language found by the transformation unit;
- a supplementary word information storage unit for storing information on the word supplemented by the transformation unit;
- a supplementary word display mode storage unit for storing information on a display mode, the display mode being applied to the word supplemented so as to display the word in an appearance different from other words composing the target language sentence; and
- a display unit for displaying the target language sentence generated by the generation unit, wherein the word supplemented is displayed in the appearance different from the other words in accordance with the display mode.

The supplementary word information storage unit may include a structure data storage unit for storing a position of the supplemented word in a semantic structure, and a display data storage unit for storing a display position of the supplemented word counted from a head position of the phrase structure generated by the target language sentence generation unit.

The transformation unit may comprise the following units:

- a subject presence judging unit for judging a presence or absence of a subject which agrees with a verb of the target language sentence;
- a first principle clause presence judging unit for judging a presence or absence of a principle clause in the target language sentence when the subject presence judging unit has judged the subject to be absent;
- a principle clause subjective presence judging unit for judging a presence or absence of a subjective in the principle clause when the subject presence judging unit has judged the subject to be present;
- a first supplementary word designating unit for designating a word corresponding to the subjective as a supplemented word when the principle clause subjective presence judging unit has judged the subjective to be present;
- a first subordinate clause presence judging unit for judging a presence or absence of a subordinate clause in the target language sentence when the subject presence judging unit has judged the subject to be absent or when the principle clause subjective presence judging unit has judged the subject to be absent;
- a subordinate clause subjective presence judging unit for judging a presence or absence of a subjective in the subordinate clause when the subordinate clause present judging unit has judged the subordinate clause to be present;
- a second supplementary word designating unit for designating a word corresponding to the subjective as a supplemented word when the subordinate clause subjective presence judging unit has judged the subjective to be present;
- a first preceding sentence subjective presence judging unit for judging a presence or absence of a subjective in a sentence immediately preceding the target language sentence when the subordinate clause presence judging unit has judged the subordinate clause to be absent or when the subordinate clause subjective presence judging unit has judged the subjective to be absent;
- a third supplementary word designating unit for designating a word corresponding to the subjective as a supplemented word when the preceding sentence subjective presence judging unit has judged the subjective to be present;
- a first preceding sentence objective presence judging unit for judging a presence or absence of an objective in the preceding sentence when the preceding sentence subjective presence judging unit has judged the subordinate clause to be absent;
- a fourth supplementary word designating unit for designating a word corresponding to the objective as a supplemented word when the preceding sentence objective presence judging unit has judged the objective to be present;
- a fifth supplementary word designating unit for designating a second personal pronoun as a supplemented word when the preceding sentence objective presence judging unit has judged the objective to be absent;
- an object presence judging unit for judging a presence or absence of an object which agrees with the verb of the target language sentence;
- a second principle clause presence judging unit for judging a presence or absence of a principle clause in the target language sentence when the object presence judging unit has judged the object to be absent;
- a principle clause objective presence judging unit for judging a presence or absence of an objective in the principle clause when the principle clause presence judging unit has judged the principle clause to be present;
- a sixth supplementary word designating unit for designating a word corresponding to the objective as a supplemented word when the principle clause objective presence judging unit has judged the objective to be present;
- a second subordinate clause presence judging unit for judging a presence or absence of a subordinate clause in the target language sentence when the principle clause presence judging unit has judged the principle clause to be absent or when the principle clause objective presence judging unit has judged the object to be absent;

a subordinate clause objective presence judging unit for judging a presence or absence of an objective in the subordinate clause when the subordinate clause presence judging unit has judged the subordinate clause to be present;

a seventh supplementary word designating unit for designating a word corresponding to the objective as a supplemented word when the subordinate clause objective presence judging unit has judged the objective to be present;

a second preceding sentence objective presence judging unit for judging a presence or absence of an objective in the preceding sentence when the subordinate clause presence judging unit has judged the subordinate clause to be absent or when the subordinate clause objective presence judging unit has judged the objective to be absent;

an eighth supplementary word designating unit for designating a word corresponding to the objective as a supplemented word when the preceding sentence objective presence judging unit has judged the objective to be present;

a second preceding sentence objective presence judging unit for judging a presence or absence of a subjective in the preceding sentence when the preceding sentence objective presence judging unit has judged the objective to be absent;

a ninth supplementary word designating unit for designating a word corresponding to the subjective as a supplemented word when the preceding sentence subjective presence judging unit has judged the subjective to be present; and a tenth supplementary word designating unit for designating a demonstrative pronouns as a supplemented word when the preceding sentence subjective presence judging unit has judged the subjective to be absent.

The supplementary word storage unit may further comprise a supplementary word type data storage unit for storing a type of a supplemented word when each of the first through tenth supplementary word designating units has designated the supplemented word.

The supplementary word display mode storage unit may comprise the following units:

a subject mode storage unit for storing display mode information indicating that a subject has been supplemented when one of the first, second, third, fourth, and fifth supplementary word designating units has designated the supplemented word, in a case that the subject presence judging unit has judged the subject to be absent;

an object mode storage unit for storing display mode information indicating that an object has been supplemented when one of the sixth, seventh, eighth, ninth, and tenth supplementary word designating units has designated the supplemented word, in a case that the object presence judging unit has judged the object to be absent.

The display unit may comprise the following units:

a supplementary word type data extract unit for extracting a type of a supplemented word from the supplementary word type data storage unit;

a corresponding display mode information extract unit for extracting a display mode information corresponding to the supplementary word type from the supplementary word display mode storage unit; and a display unit for displaying a supplemented word in accordance with supplementary word display mode information.

As a result of the series of operations performed in these units, users can easily recognize a supplemented word, which is displayed in a special mode to be distinguished from the other words contained in the target language sentence.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 5 shows the sample sentence in Japanese, which has been transcribed to a Japanese syllabic script called hiragana.

FIG. 6 shows the sample sentence in Japanese, which has been divided into individual words as a result of the morphological analysis.

FIG. 11 shows a node information table assigned to each node shown in the phrase structure of Embodiment 1.

FIG. 12 shows a word information table held in the supplementary word storage unit of Embodiment 1.

FIGS. 13A and 13B show sample sentences in Japanese and their English equivalents, which are displayed with special display modes.

FIG. 18 shows a node information table held in the target language sentence generation unit of Embodiment 3.

FIG. 19 shows a sample sentence in Japanese inputted to the translator of Embodiment 5 of this invention.

FIG. 22 shows a word information table held in the supplemented word storage unit of Embodiment 5.

DESCRIPTION OF THE PREFERRED EMBODIMENTS

<Embodiment 1>

Figure 4:
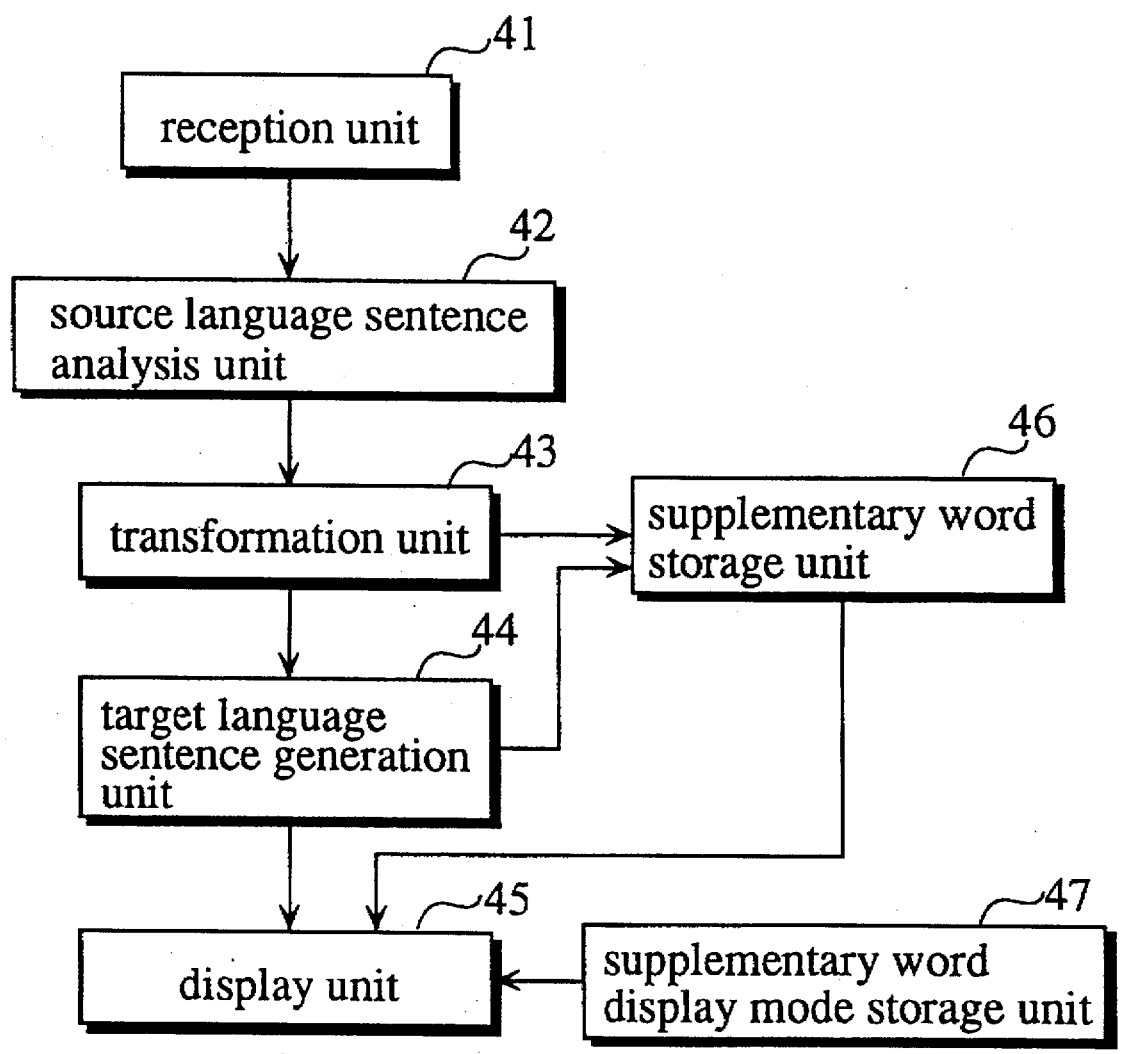
FIG. 4 is a block diagram showing the construction of the translator of Embodiment 1 of this invention.

As shown in FIG. 4, the translator of this embodiment has a reception unit 41, a source language sentence analysis unit 42, a transformation unit 43, a target language sentence generation unit 44, a display unit 45, a supplementary word storage unit 46, and a supplementary word display mode storage unit 47.

More specifically, a key board or a tablet device can be used as the reception unit 41, a cathode ray tube (CRT) display device or a printer as the display unit 45, and memory as the supplementary word storage unit 46 and the supplementary word display mode storage unit 47. Also, CPU can be used to control the source language sentence analysis unit 42, the transformation unit 43, and the target language sentence generation unit 44.

The reception unit 41 receives a source language sentence.

The source language sentence analysis unit 42 applies orphological and semantic analyses to the source language sentence.

The transformation unit 43 transforms the semantic structure of the source language sentence into that of the target language, and determines target language words corresponding to the individual words composing the source language sentence.

The target language sentence generation unit 44 generates a target language sentence by rearranging the target language words determined, in conformation to the syntax of the target language.

The display unit 45 displays both the original source language sentence and the target language sentence thus generated.

The supplementary word storage unit 46 holds a word information table having information to identify a word that have been supplemented in the course of translation. The contents of this table will be detailed below.

The supplementary word display mode storage unit 47 holds display information on special display modes, which are used to display a supplemented word distinguishably from the other words in a generated sentence.

A series of operations to be executed by the translator of this embodiment is detailed below. The same sample sentence in Japanese as is used for the conventional translator is used again here, so that the differences between these translators can be clarified.

Figure 1:
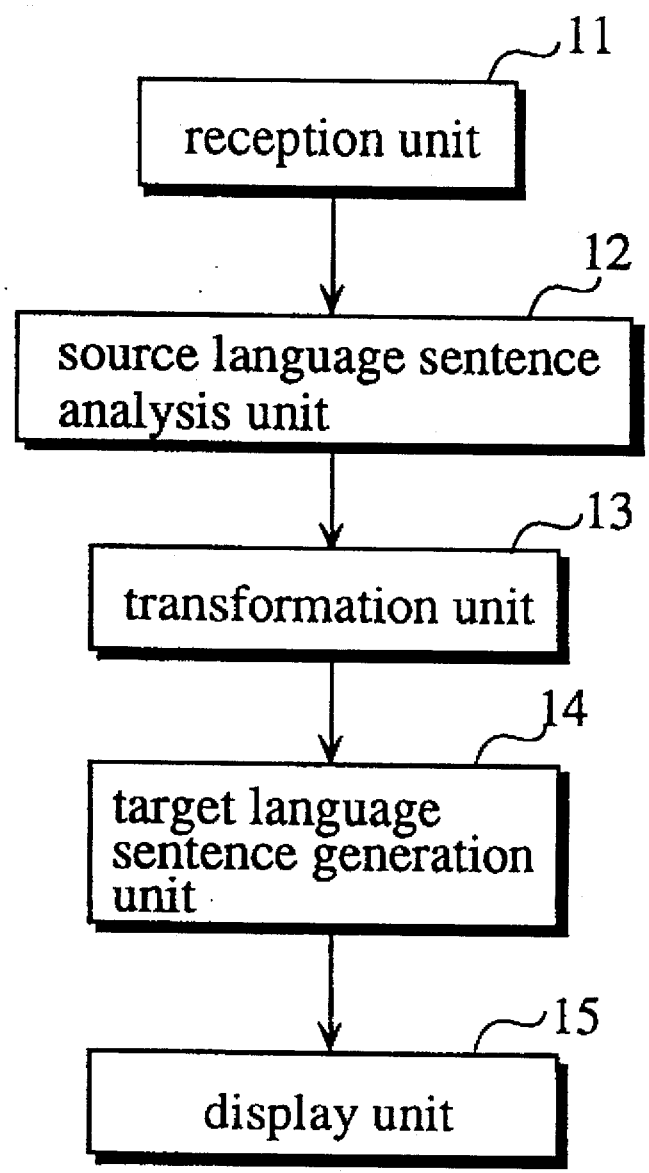
FIG. 1 is a block diagram showing the construction of a conventional translator.
Figure 2:
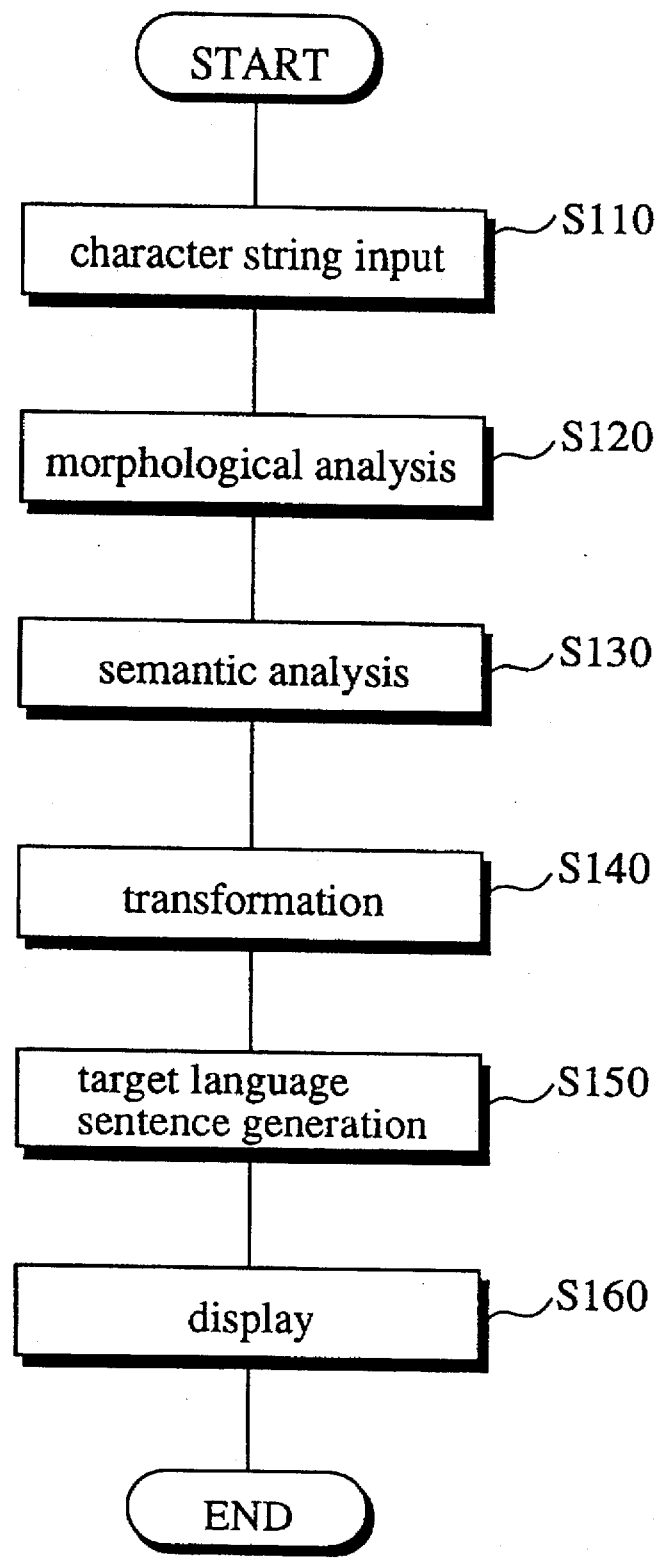
FIG. 2 is a flowchart depicting a series of operations commonly performed both by the conventional translator and the translator of this invention.
Figure 3:
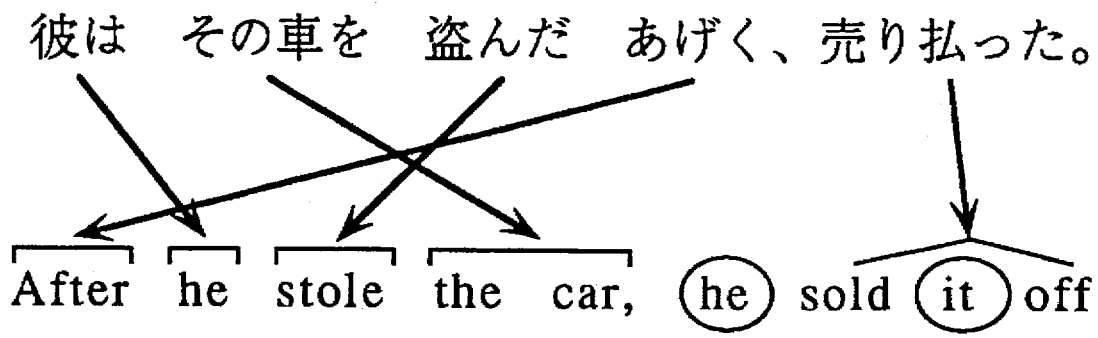
FIG. 3 shows a pair of sample sentences in Japanese as a source language sentence and an English equivalent as a target language sentence processed by the conventional translator.

With reference to FIG. 2, at first, the reception unit 41 receives the Japanese sentence as the source language sentence, and stores it as a character string written in hiragana (Japanese syllabic script) shown in FIG. 5 (Step 110).

The hiragana character string is applied a morphological analysis by the source language sentence analysis unit 42. In the analysis, the Japanese sentence is divided into individual words as shown in FIG. 6 with reference to a word dictionary (Step 120).

Figure 7:
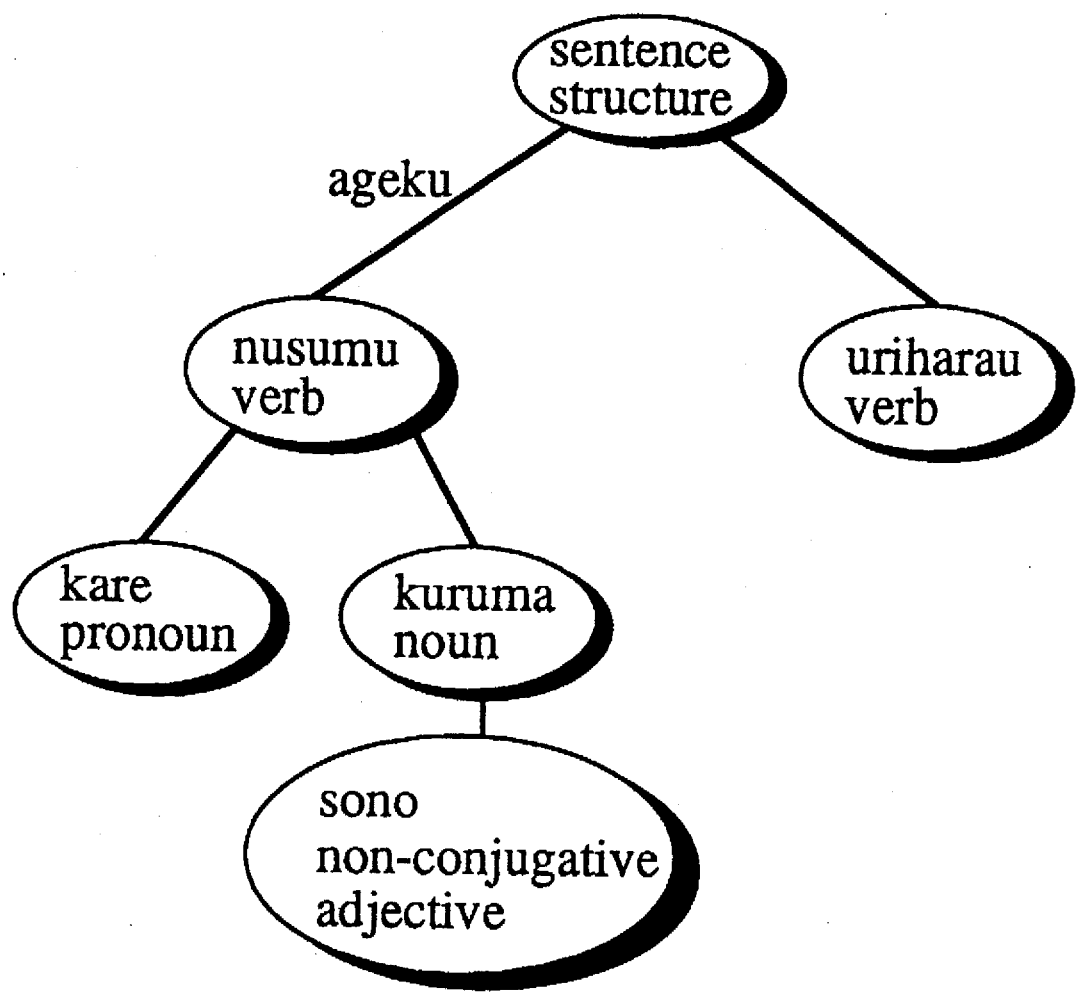
FIG. 7 is a branching-tree diagram showing the semantic structure of the sample sentence in Japanese analyzed by the source language sentence analysis unit of Embodiment 1.

The words are further analyzed semantically in the source language sentence analysis unit 42. In the analysis, the relationship between a word and another is analyzed based on information on vocabulary, syntax, and semantics so as to organize the semantic structure of the source language. For example, "wa" and "wo" shown in FIG. 6 corresponding to は and を respectively are a part of speech in Japanese language called "particles" which do not exist in English. These particles have a function of determining the cases of their antecedent nouns. For example, whether 彼 is translated into "he" or "him" in FIG. 16 depends on the particle which follows 彼. Each node shown in the branching-tree diagram of FIG. 7 represents an individual word and is assigned a word information table having lexical information such as script and word class, as well as conjugational information such as node identification number, dependency between one node with another (Step 130).

Figure 8:
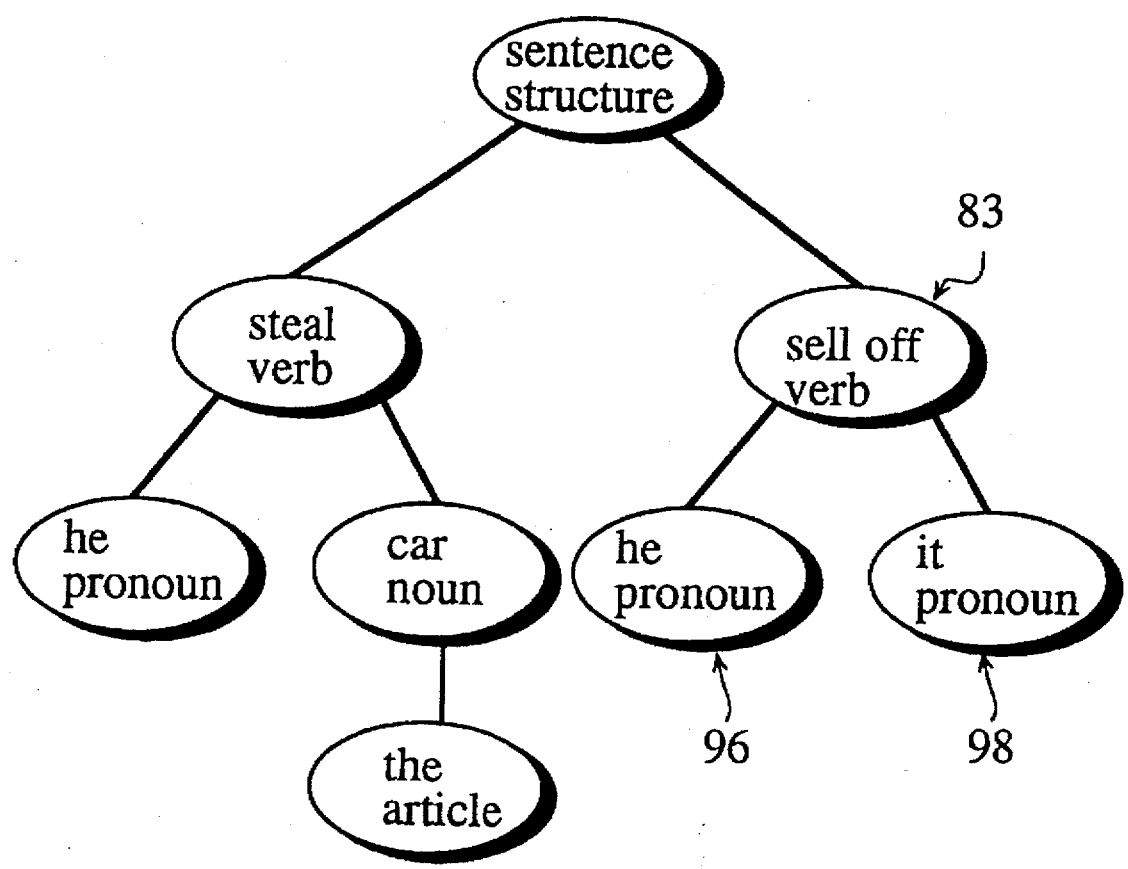
FIG. 8 is a branching-tree diagram showing the semantic structure of the English sentence rearranged by the transformation unit of Embodiment 1.

Then, the transformation unit 43 determines target language words corresponding to the individual words composing the source language sentence, and organizes the semantic structure of the target language sentence by rearranging the words determined. For example, "steal" and "sell-off" in FIG. 8 are selected respectively as equivalents for the Japanese verbs "nusumu" and "uriharau" in FIG. 7.

At the same time, the syntactic function of the determined words is analyzed based on the grammatical information on the target language. For example, it is checked whether the verb "steal" is being accompanied by a subject and an object, based on the information "Subject+steal (+object)". It proves that the verb is being accompanied by both a subject and an object in this case. In the same manner, the presence of a subject and object of the phrase "sell off" is checked based on the information, "Subject+sell+Object+ off". It proves that both a subject and an object are missing in this case, so that a proper word is supplemented for each through one of the following methods. As mentioned before, a supplemented word represents a word which corresponds to a subject or an object unnecessary to exhibit in a source language sentence but necessary in a target language sentence.

Type 1) When a word to be supplemented corresponds to a thing, then a demonstrative pronoun, "it" is supplemented.

Type 2) In a complex sentence, when a word to be supplemented corresponds to a subject, a personal pronoun, "he" is supplemented.

Type 3) In a complex sentence, when a word to be supplemented corresponds to a subject, a most suitable personal pronoun is selected, according to the gender and the number of the person omitted.

Beside these three, other methods can be applied. Although the supplemented words are all pronouns in these three methods, nouns can be supplemented words in another method as will be described in Embodiment 2.

Further in the Step 130, the semantic structure of the target language sentence is analyzed as shown in the branching-tree diagram of FIG. 8.

Comparing FIGS. 7 and 8 reveals that there is no substantial syntactic difference between the two sentences, so that a word-for-word translation can be safely applied except the words supplemented: "he" and "it".

The node information table assigned to each node shown in FIG. 7 is taken over to each corresponding node shown in FIG. 8. A new node information table is generated for each newly supplemented word.

Information on the supplemented words is stored in a word information table 40 held in the supplementary word storage unit 46. As shown in FIG. 12, the table 40 includes information on structure and display for each node, which represents a supplemented word. At this stage of processing, node identification numbers and parent node identification numbers of the supplemented words "he" and "it" is stored as the information on structure (Step 140).

Figures 9, 10:
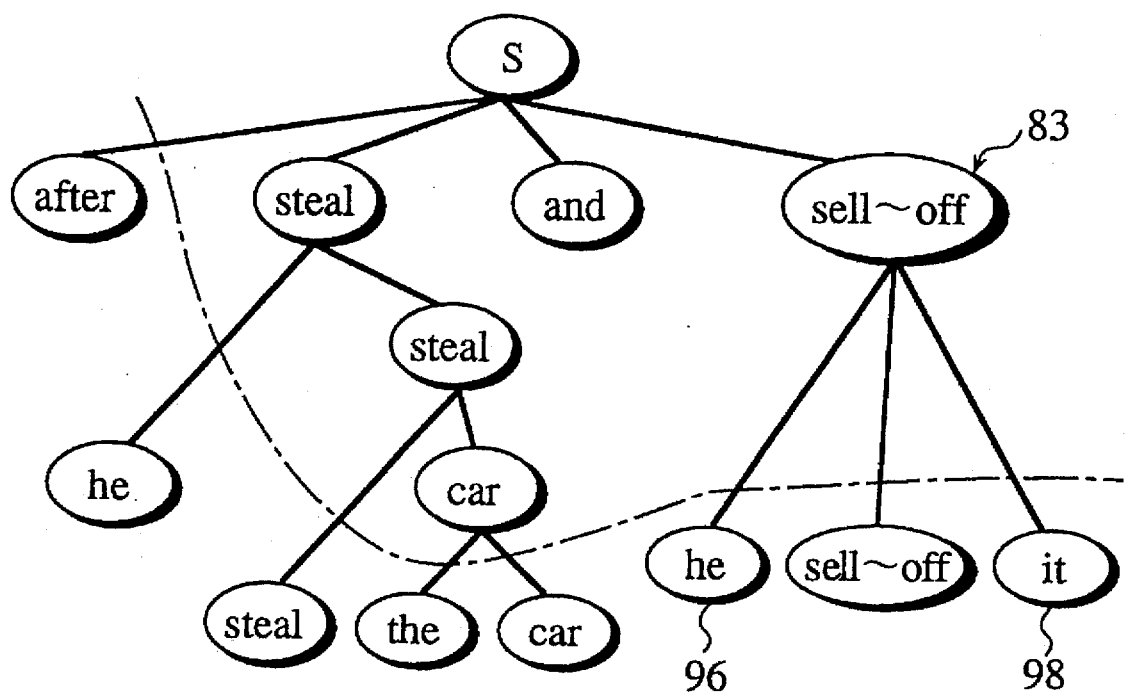
FIG. 9 is a branching-tree diagram showing the phrase structure of the English sentence generated by the target language sentence generation unit of Embodiment 1.
FIG. 10 shows the English sentence rearranged based on the phrase structure of FIG. 9.

Then, the target language sentence generation unit 44 generates the phrase structure of the English sentence, in conformance to English grammar, based on the semantic structure shown in FIG. 8. The phrase structure thus generated is shown in FIG. 9. The terminal nodes in this structure correspond to individual words composing the target language sentence. Each node in the phrase structure takes over the information in the semantic structure shown in FIG. 8. Each newly generated node is assigned a new node information table which has information on Japanese script and word class, English script, word class, character, and meaning code, and structural information such as node identification number and parent node identification number. FIG. 11 shows the contents of the node information table 30 for the node representing the supplemented word "it".

Then the target language sentence generation unit 44 generates an English character string equivalent to the Japanese sentence with reference to the information stored in the node information table 30. Here, additional information such as tense, number (single or plural), and letter size (capital or small) is taken into consideration. The character string thus generated as shown in FIG. 10 is written to a buffer. Each number below the English sentence indicates the position of each character when counted from the head character. The target language sentence generation unit 44 holds information on the position of a supplemented word to a predetermined position in the table. As a result, the table 40 shown in FIG. 12 is completed (Step 150).

Then, the display unit 45 receives character information for the generated English sentence from the target language sentence generation unit 44. The unit 45 further receives the information on supplemented words "it" and "he" and display modes respectively from the supplementary word storage unit 46 and the supplementary word display mode storage unit 47. The display unit 45 assigns a predetermined display mode to each character of the English sentence, and further assigns display mode data received from the supplementary word display mode storage unit 47 to each of the supplemented words, based on the information on supplementary words. Thus, both the original source language sentence and the generated target language sentence are displayed on the screen as shown in FIG. 13A. In the case, the words "he" and "it" are displayed in reverse for the user to recognize that they are supplemented words (Step 160). The display modes to distinguish supplemented words can be reverse, hatch, underline, the use of parentheses, or font changes including italic and bold.

FIG. 13B shows another pair of sentences with supplemented words displayed in reverse.

<Embodiment 2>

The translator of this embodiment applies various modes to a supplemented word, depending on how the word has been selected.

Figure 14:
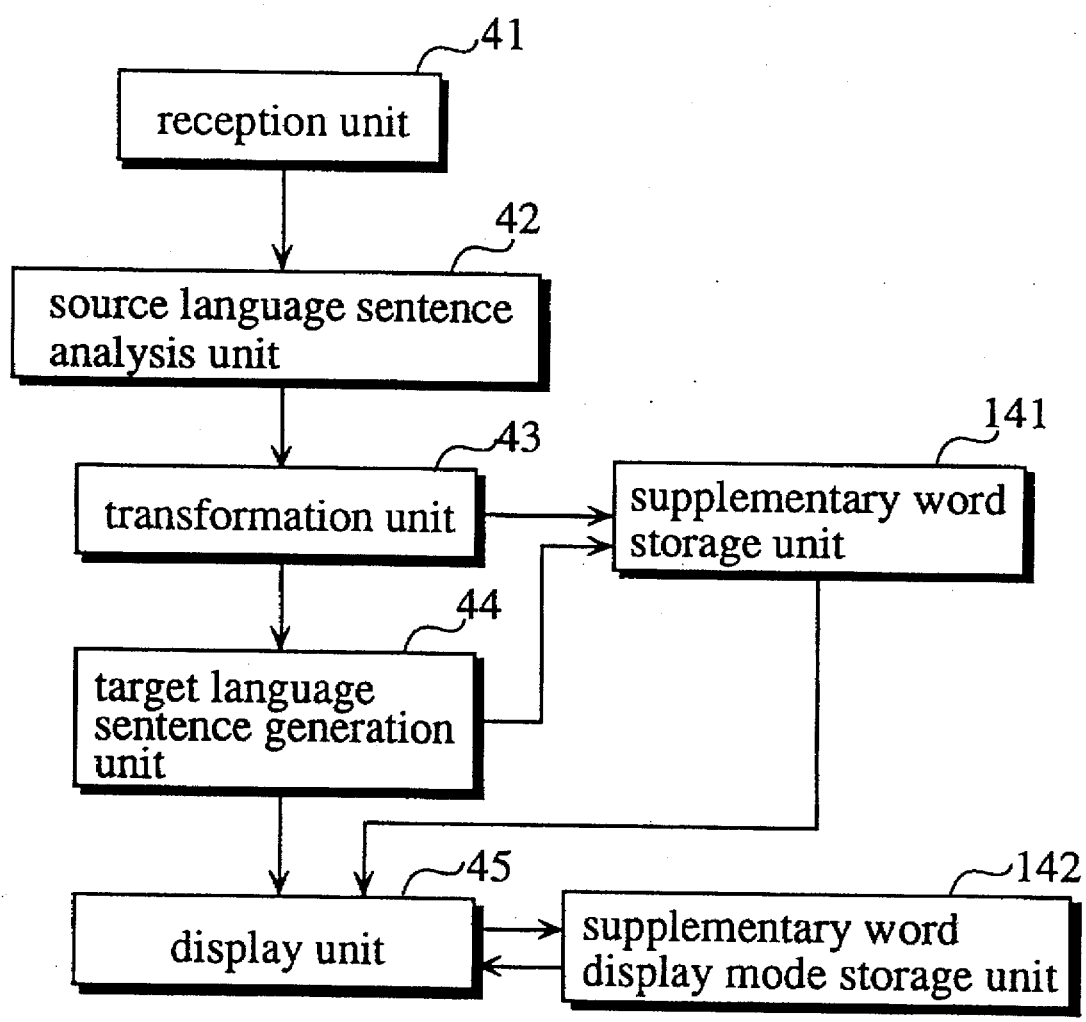
FIG. 14 is a block diagram showing the construction of the translator of Embodiment 2 of this invention.

As shown in FIG. 14, the translator is provided with a supplementary word storage unit 141 and a supplementary word display mode storage unit 142, which have functions different from those of the supplementary word storage unit 46 and the supplementary word display mode storage unit 47 of Embodiment 1.

Figure 15:
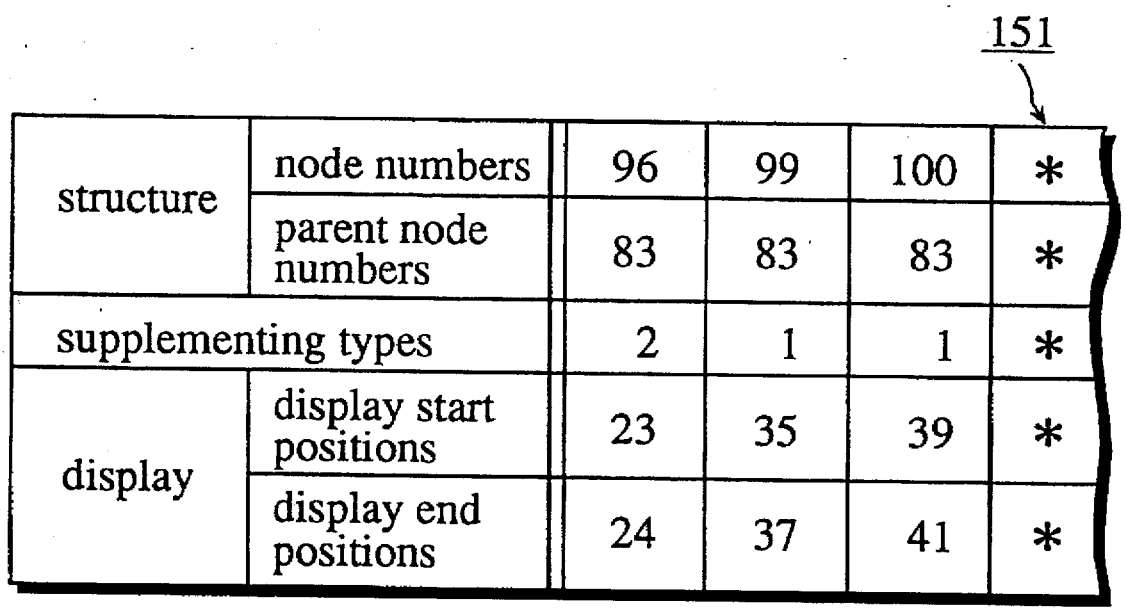
FIG. 15 shows a word information table held in the supplementary word storage unit of Embodiment 2.

The supplementary word storage unit 141 holds a word information table 151 shown in FIG. 15, which has information on various supplementing methods in addition to supplemented words themselves. Instead of the method of the type 1) described in Embodiment 1, the following method is used:

type 4) When a word to be supplemented corresponds to a "thing", the "thing" is made the supplemented word. And identification numbers for the types 1-3 of the method is stored in a predetermined position in the table 151.

The supplementary word display mode storage unit 142 holds display mode data which is different depending on the types of the methods for supplementing words stored in the table 151.

For example, the following three display modes are stored for each supplementing method described in this embodiment:

mode 2: hatch mode 3: bold mode 4: reverse

When a word has been supplemented, the transformation unit 43 identifies its supplementing method and stores data corresponding to the method in the column for supplementing types in the table 151.

Figure 16:
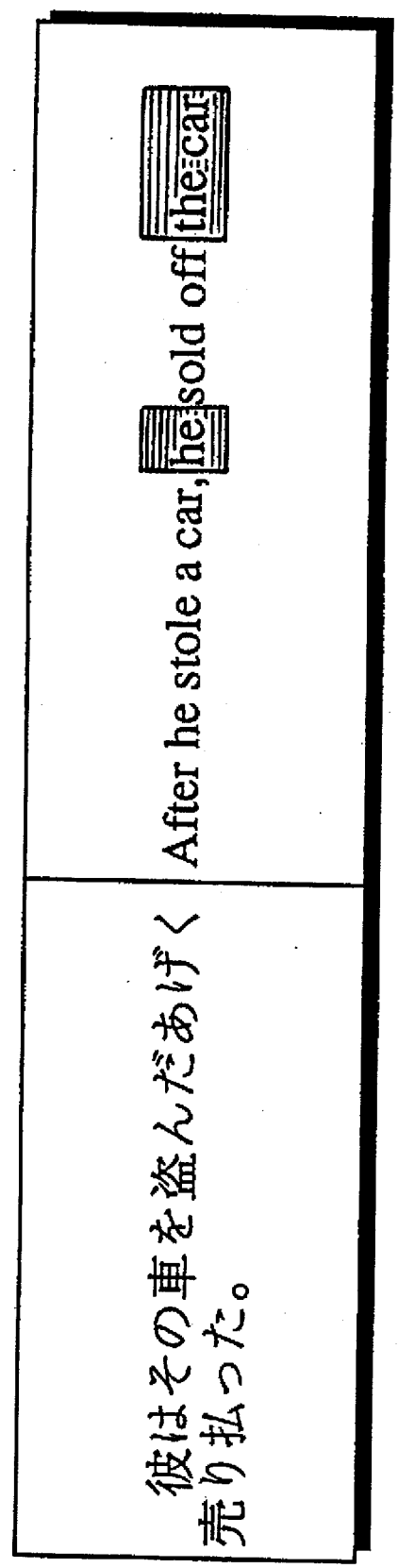
FIG. 16 is a pair of the first sample sentence in Japanese and its English equivalent, which is displayed with another special mode according to Embodiment 2.

In response to a reception of information on a word to supplement from the supplementary word storage unit 141, the display unit 45 abstracts display mode data corresponding to the method from the supplementary word display mode storage unit 142. A pair of a source and target language sentences as shown in FIG. 16 is displayed in which one supplemented word "he" is displayed in hatch and the other supplemented word "the car" is displayed in reverse.

According to this embodiment, users can easily distinguish supplemented words and recognize the method by which they are supplemented.

<Embodiment 3>

Figure 17:
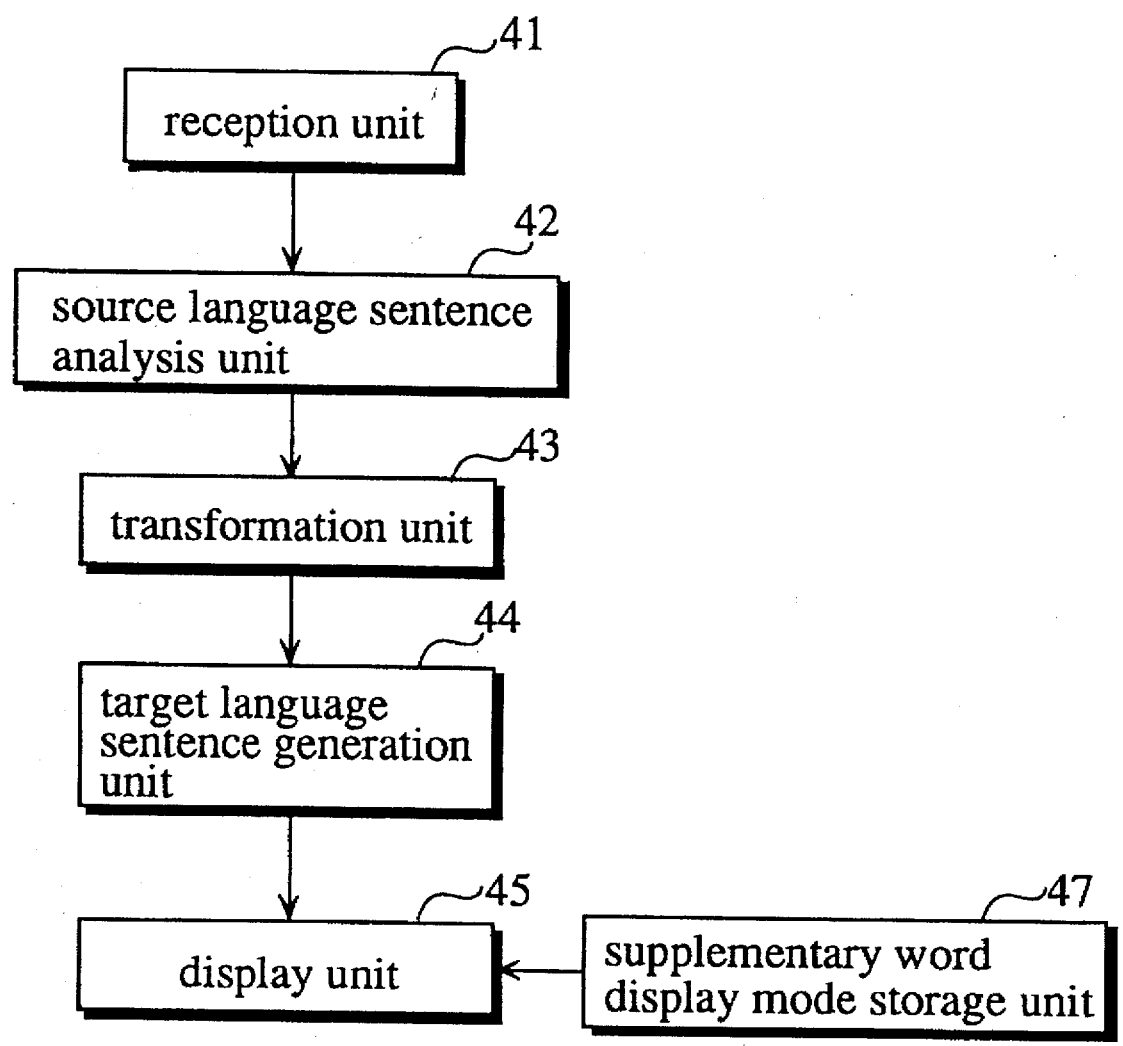
FIG. 17 is a block diagram showing the construction of the translators of Embodiments 3 and 4 of this invention.

Unlike Embodiment 1, the translator of this embodiment shown in FIG. 17 incorporates a supplementary word information table into a node information table.

FIG. 18 shows an example of the node information table 31 stored in the target language sentence generation unit 44. The table 31 has a column for supplement identification marks, which are referred to by the display unit 45. As the marks, binary data can be used: "0" represents no supplement and "1" represents otherwise.

When the mark corresponding to the node to be displayed is "1", the display unit 45 takes out display mode data from the supplementary word display mode storage unit 47 and displays the supplemented word distinguishably from the other words.

<Embodiment 4>

The translator of this embodiment possesses both the characteristics of Embodiments 2 and 3, i.e. a supplemented word can be displayed by various modes depending on how the word is supplemented and a word information table is incorporated into a node information table.

The column 32 in the table 31 holds data indicating the supplementing methods in addition to the presence or absence of supplemented words.

The supplementary word display mode storage unit 47 holds display mode data, which is different depending on the method.

The data for supplementing methods, for example, 0, 1, 2 - - - , are stored in the column 32 when the transformation unit 43 identifies the method in response to a generation of a supplemented word.

The display unit 45 refers to the data on the column 32 for each node and abstracts display mode data corresponding to the method from the supplementary word display mode storage unit 47. An example for the display is already shown in Embodiment 2.

<Embodiment 5>

The translator of this embodiment has the same construction as that of Embodiment 2 shown in FIG. 14.

The following description is focused on the construction of the transformation unit 43.

When the Japanese sentence in the box shown in FIG. 19 is inputted through the reception unit 41, the sentence is stored as a hiragana character string to the inside of the translator. The sentence written in Roman letters and a hiragana character string under the box correspond to the Japanese sentence in the box.

Figure 20:
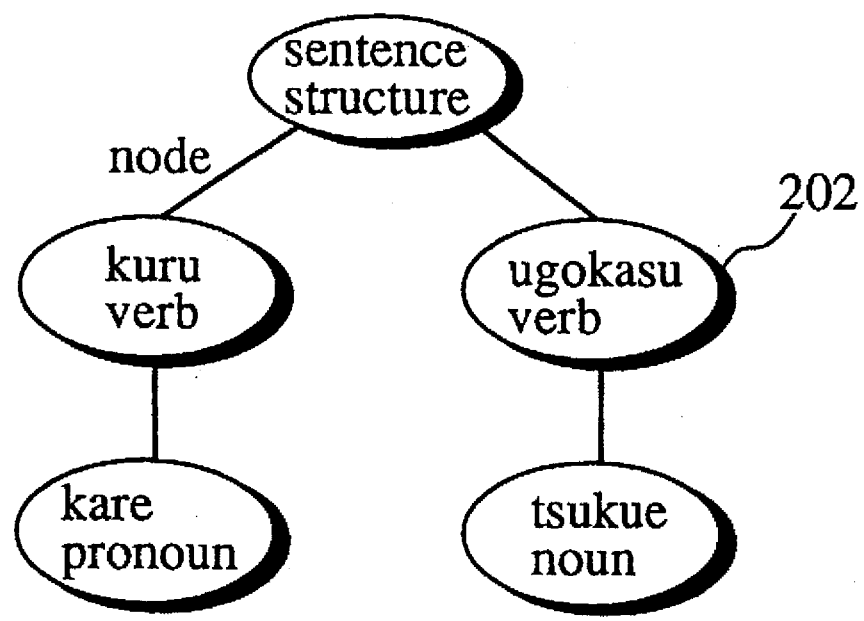
FIG. 20 is a branching-tree diagram showing the semantic structure of the sample sentence analyzed by the source language sentence analysis unit of Embodiment 5.

The source language sentence analysis unit 42 divides the hiragana character string into individual words by means of a morphological analysis, and forms a branching-tree diagram shown in FIG. 20 by means of a semantic analysis.

Figure 21:
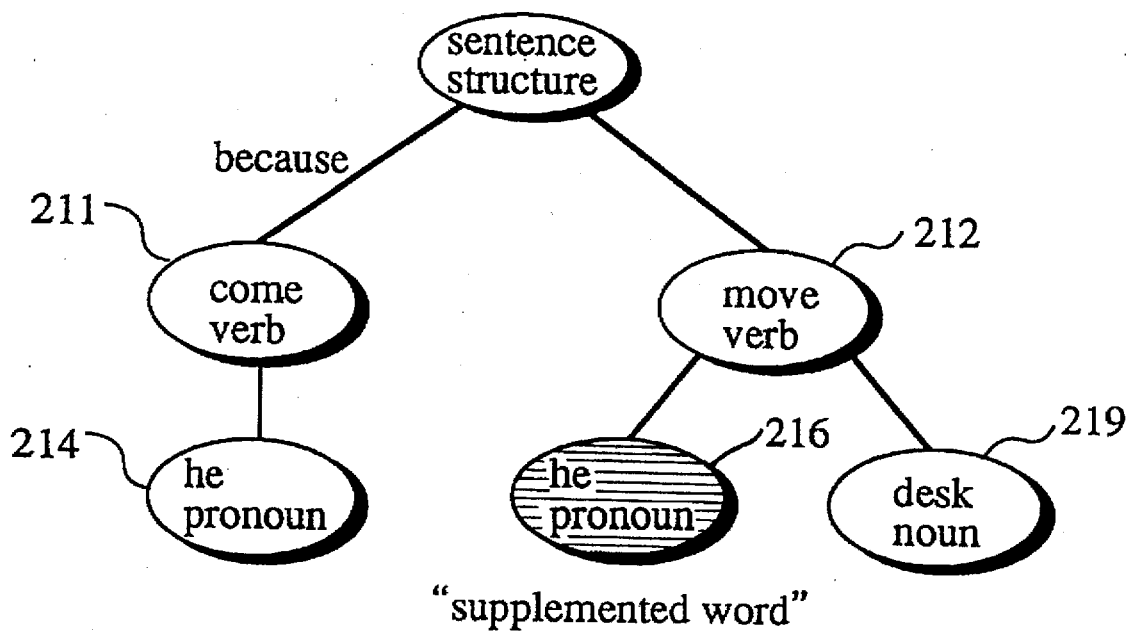
FIG. 21 is a branching-tree diagram showing the semantic structure of the English sentence rearranged by the transformation unit of Embodiment 5.

The transformation unit 43 selects an appropriate target language word for each node in the Japanese sentence shown in FIG. 20 and forms an English semantic structure. FIG. 21 shows a branching-tree diagram showing the English semantic structure.

The following is a description on how the child node 216 indicating the supplemented word "he" has been selected.

The transformation unit 43 judges whether the verb "move" in the parent node 212 has a corresponding subject or not. The principal clause to which the parent node 212 belongs exhibits an object "desk" in the child node 219, but dose not exhibit any subject. This is because the verb "ugokasu" in the parent node 202 of the Japanese sentence shown in FIG. 20 does not have any subject.

Then, whether the sentence shown in FIG. 21 has a subordinate clause or not is judged. Since the sentence has a subordinate clause including the verb "come" in the parent node 211, it is judged whether the subordinate clause has a subjective or not. Since the subordinate clause has a subjective case "he" in the child node 214, "he" is supplemented as a supplemented word to the child node 216. The supplemented word is written as structure data to the word information table 221 held in the supplemented word storage unit 141 shown in FIG. 22. The supplemented word "he" corresponds to the type 2 described in Embodiment 2, so that the reference number "2" for the type is written to the word information table 221. After each node has been given an appropriate target language word and the semantic structure of the target language has been established, the target language sentence generation unit 44 is started.

Figure 23:
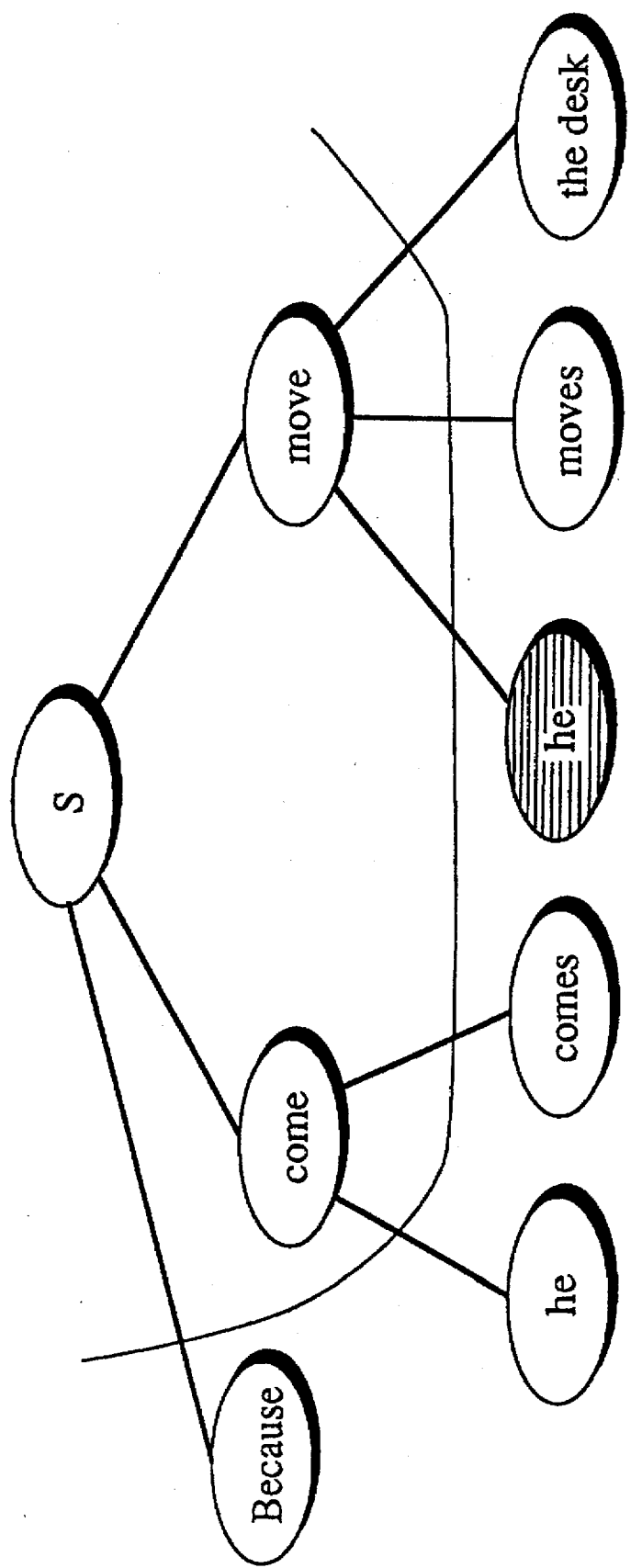
FIG. 23 is a branching-tree diagram showing the phrase structure of the English sentence generated by the target language sentence generation unit of Embodiment 5.

The target language sentence generation unit 44 generates an English phrase structure shown in FIG. 23 by applying the English semantic structure shown in FIG. 21 in conformance with English grammar. In FIG. 23, the supplemented word "he" is displayed in hatch for easy recognition as detailed in Embodiment 1. Then, the display data for the supplemented word are written to the word information table 221 held in the supplemented word storage unit 141. The display data includes the display start position and the display end position of the supplemented word when counted from the head character.

The word information table 221 held by the supplemented word storage unit 141 shows a structure data 222 including the node number of a supplemented word and the parent node number, supplement type data 223, and display data 224. The structure data 222 and the supplement type data 223 are written by the transformation unit 43, and the display data 224 are written by the target language sentence generation unit 44.

The supplemented word display mode storage unit 142 stores display mode information for each supplement type. The display mode information indicates, for example, the application of reverse, hatch, and underline, and may include changing display colors.

The display unit 45 displays character information received from the target language sentence generation unit 44. In this case, the display unit 45 receives the supplement type data 223 and the display data 224 in the word information table 221 stored in the supplemented word storage unit 141, and displays supplemented words in accordance with the display modes of each supplement type.

Figure 24:
FIG. 24 shows the English sentence rearranged based on the phrase structure of FIG. 19.

FIG. 24 shows a Japanese sentence 241 displayed on the display unit 45 and its English translation 242. In the English translation 242, the supplemented word "he" is displayed in hatch as the display mode of type 2. As a result, users can recognize that "he" has been supplemented in the course of translation by the translator.

Here, the translator has misjudged the subject of the verb "move" in the English sentence shown in FIG. 24. The subject of the verb "move" must be "we", not "he". It is above the translator's understanding that the sentence means that we are going to move our desks in order to put his desk before he joins us. Thus, the transformation unit 43 of the translator cannot fully analyze the semantic structure of Japanese.

If the supplemented word "he" were displayed in the same display mode as the other words of the sentence, the user would have to check every word of the translated English. However, the hatching makes the user doubt the reliability of "he" and find that "we" is an appropriate word to be supplemented.

Figure 25:
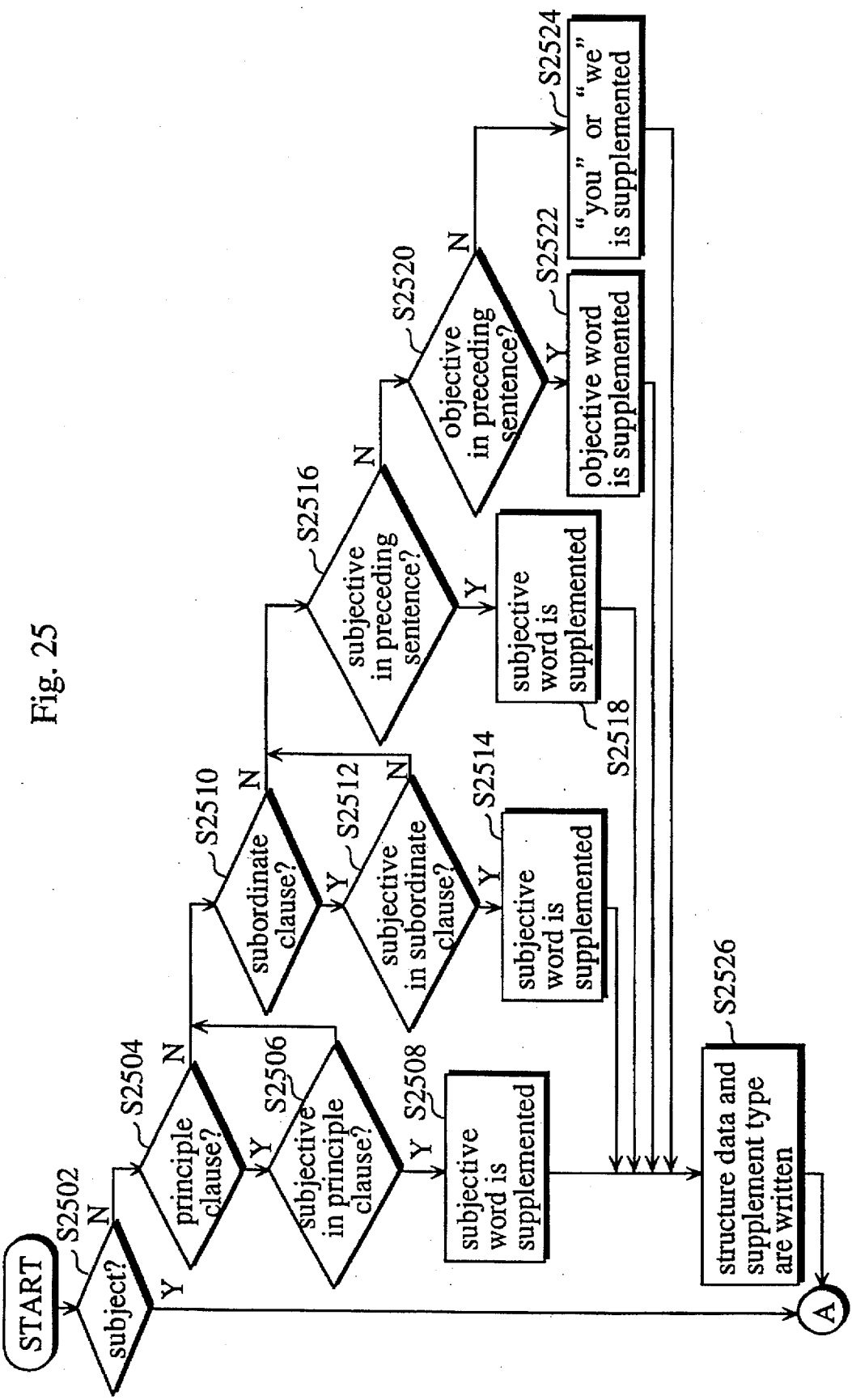
FIG. 25 is a former flowchart showing the detailed operation of the transformation unit of Embodiment 5.
Figure 26:
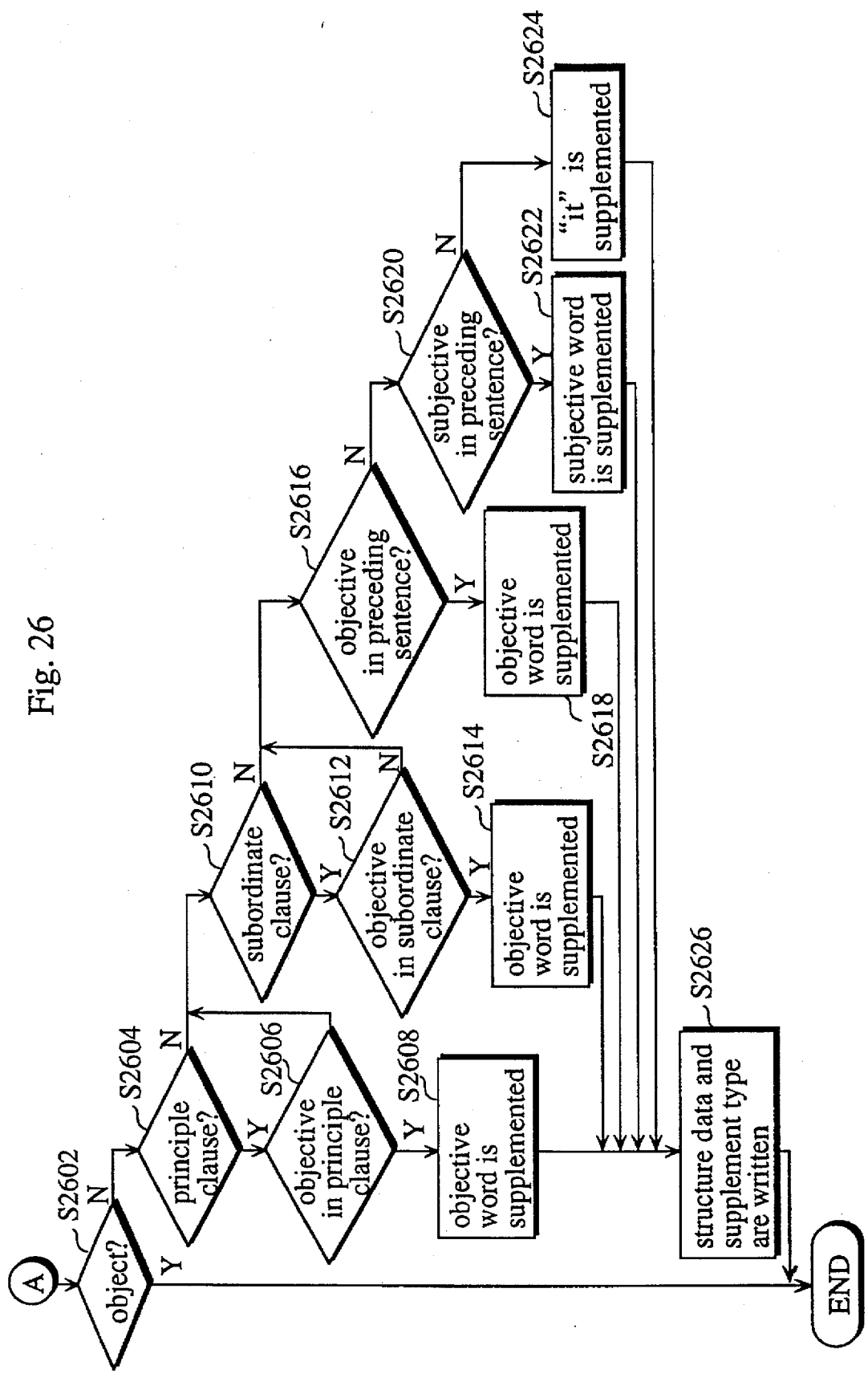
FIG. 26 is a latter flowchart showing the detailed operation of the transformation unit of Embodiment 5.

The operation of determining a supplemented word in the transformation unit 43 of this embodiment will be described with reference to the flowcharts shown in FIGS. 25 and 26.

First, it is judged whether the child node 219 of the parent node (for example node 212) in the semantic structure shown in FIG. 21 has a subject (S250). When it has one, the operation proceeds to S2602 because there is no need of supplementing a subject, and otherwise it is judged whether there is a principal clause in the sentence (S2504). When there is, it is judged whether the principal clause has a subjective or not (S2506). When there is one, the word corresponding to the subjective is made a supplemented word (S2508), and the operation proceeds to S2526.

On the other hand, when there is no principal clause in the same sentence, it is judged whether there is a subordinate clause in the same sentence (S2510). When there is one, it is judged whether the subordinate clause has a subjective or not (S2512). When there is one, the word corresponding to the subjective is made a supplemented word (S2514), and the operation proceeds to S2526.

When there is no subordinate clause in the same sentence, or when there is no subjective in a subordinate clause, it is judged whether a sentence immediately preceding the sentence has a subjective or not (S2516). When it has one, the word corresponding to the subjective is made a supplemented word (S2518), and the operation proceeds to S2526.

When the preceding sentence has no subjective, it is judged whether the preceding sentence has an objective or not (S2520). When it has one, the word corresponding to the objective is made a supplemented word (S2522), and the operation proceeds to S2526. When it does not have any objective, "you" or "we" is made a supplemented word (S2524), and the operation proceeds to S2526.

In S2526, the subjective has been supplemented, so that the supplement type "2" for indicating that the supplemented word is a subject is written to the word information table 221 together with the structure data 222, and the operation goes to S2602.

Then, the presence or absence of an object is judged in S2602. When it is present, the operation is terminated, and otherwise it is judged whether there is a principal clause in the same sentence (S2604). When there is a principal clause, it is judged whether the principal clause has an objective or not (S2606). When it has, the word corresponding to the objective is made a supplemented word (S2608), and the operation goes to S2626.

When there is no principal clause in the same sentence, or when the principal clause has no object, it is judged whether there is a subordinate clause in the same sentence (S2610). When there is a subordinate clause, it is judged whether the subordinate clause has an objective (S2612). When it has one, the word corresponding to the objective is made a supplemented word (S2614), and the operation goes to S2626.

When there is no subordinate clause in the same sentence, or when there is no objective in a subordinate clause, it is judged whether the preceding sentence has an objective or not (S2516). When it has one, the word corresponding to the objective is made a supplemented word (S2518), and the operation proceeds to S2526.

When the preceding sentence has no objective, it is judged whether the preceding sentence has a subjective or not (S2620). When it has, the word corresponding to the subjective is made a supplemented word (S2622), and the operation proceeds to S2626.

When the preceding sentence has no subjective, "it" is supplemented (S2624), and the operation goes to S2626. In S2626, the structure data 222 and the supplement type data 223 are written to the word information table 221 (S2626), and the operation is terminated.

In this embodiment, when the supplemented word is wrong, the wrong word on the display can be pointed by a pointing device and a correct word can be inputted by providing a correct supplemented word reception unit and correcting the contents stored in the transformation unit 43, the target language sentence generation unit 44, and the supplemented word storage unit 141.

In this embodiment, supplemented words are classified into subjects and objects; however, in another embodiment supplemented words can be divided depending on by which of principal clauses, subordinate clauses, preceding sentences, and default they are supplemented.

Although the above-mentioned embodiments describe translation from Japanese into English, other languages can be applied as well.

The use of the reception unit 41 allows the change of display modes stored in the supplementary word display mode storage unit to any desired mode.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An apparatus for translating a source language sentence into a target language sentence, comprising:

a reception means for receiving the source language sentence;

an analysis means for analyzing semantic a semantic structure of the source language sentence received;

a transformation means for transforming the analyzed semantic structure to semantic structure of the target language by determining target language words equivalent to individual words composing the source language sentence while, in case of need, supplementing a word that is omitted in the source language sentence but is necessary in the target language sentence so as to conform to grammar of the target language;

a generation means for generating the target language sentence by rearranging the determined words of the target language in conformance with the semantic structure of the target language found by said transformation means;

a supplementary word information storage means for storing information on the word supplemented by said transformation means;

a supplementary word display mode storage means for storing information on a mode, said mode being applied to the word supplemented so as to display the word in an appearance different from other words composing the target language sentence; and a display means for displaying the target language sentence generated by the generation means, wherein the word supplemented is displayed in accordance with the mode.

2. The apparatus of claim 1, wherein said supplementary word information storage means holds information on a position of the supplemented word in the target language sentence.

3. The apparatus of claim 1, wherein said transformation means supplements a word by a plurality of supplementing methods based on grammatical information of the target language, said supplementary word information storage means hold information on said supplementing methods and said information on the position of the supplemented word in the target language sentence, and said supplementary word display mode storage means holds a plurality of said modes corresponding to said methods.

4. An apparatus for translating a source language sentence to a target language sentence, comprising:

a reception means for receiving the source language sentence;

an analysis means for analyzing semantic structure of the source language sentence received;

a transformation means for transforming the analyzed semantic structure to semantic structure of the target language by determining target language words equivalent to individual words composing the source language sentence while, in case of need, supplementing a word that is omitted in the source language sentence but is necessary in the target language sentence to conform to grammar of the target language and for producing an information table containing information on each of the target language words determined;

a generation means for generating the target language sentence by rearranging the determined target language words in conformance with the semantic structure thereof found by said transformation means;

a supplementary word display mode storage means for holding information on a mode so as to display word supplemented so as to display in an apparatus different from other words composing the target language sentence; and a display means for displaying the target language sentence generated by said generation means in accordance with the mode.

5. The apparatus of claim 4, wherein said transformation means stores information on a position of the supplemented word in the target language sentence to the information table.

6. The apparatus of claim 4, wherein said transformation means supplements a word by a plurality of supplementing methods based on grammatical information of the target language, and holds both information on said supplementing methods and said information on a position of the supplemented word in the target language sentence held in said information table, and said supplementary word information storage means holds information on a plurality of said modes corresponding to said supplementing methods.

7. An apparatus for translating a Japanese language sentence into a target language sentence, comprising:

a reception means for receiving a Japanese language sentence;

a Japanese analysis means for analyzing semantic structure of the Japanese language received by said reception means;

a transformation means for transforming the analyzed semantic structure to semantic structure of the target language by determining target language words equivalent to individual words composing the Japanese language sentence while, in case of need, supplementing a word that is omitted in the Japanese language sentence but is necessary in the target language so as to conform to grammar of the target language;

a generation means for generating the target language sentence by rearranging the determined words of the target language into a phrase structure in conformance with the semantic structure of the target language found by said transformation means;

a supplementary word information storage means for storing information on the word supplemented by said transformation means;

a supplementary word display mode storage means for storing information on a display mode, said display mode being applied to the word supplemented so as to display the word in an appearance different from other words composing the target language sentence; and a display means for displaying the target language sentence generated by said generation means, wherein the word supplemented is displayed in the appearance different from the other words in accordance with said display mode.

8. The apparatus of claim 7, wherein said supplementary word information storage means includes a structure data storage unit for storing a position of the supplemented word in a semantic structure, and a display data storage unit for storing a display position of the supplemented word counted from a head position of the phrase structure generated by said target language sentence generation means.

9. The apparatus of claim 8, wherein said transformation means comprises:

a subject presence judging unit for judging a presence or absence of a subject which agrees with a verb of the target language sentence;

a first principle clause presence judging unit for judging a presence or absence of a principle clause in the target language sentence when said subject presence judging unit has judged the subject to be absent;

a principle clause subjective presence judging unit for judging a presence or absence of a subjective in the principle clause when said subject presence judging unit has judged the subject to be present;

a first supplementary word designating unit for designating a word corresponding to the subjective as a supplemented word when said principle clause subjective presence judging unit has judged the subjective to be present;

a first subordinate clause presence judging unit for judging a presence or absence of a subordinate clause in the target language sentence when said subject presence judging unit has judged the subject to be absent or when said principle clause subjective presence judging unit has judged the subject to be absent;

a subordinate clause subjective presence judging unit for judging a presence or absence of a subjective in the subordinate clause when said subordinate clause present judging unit has judged the subordinate clause to be present;

a second supplementary word designating unit for designating a word corresponding to the subjective as a supplemented word when said subordinate clause subjective presence judging unit has judged the subjective to be present;

a first preceding sentence subjective presence judging unit for judging a presence or absence of a subjective in a sentence immediately preceding the target language sentence when said subordinate clause presence judging unit has judged the subordinate clause to be absent or when said subordinate clause subjective presence judging unit has judged the subjective to be absent;

a third supplementary word designating unit for designating a word corresponding to the subjective as a supplemented word when said preceding sentence subjective presence judging unit has judged the subjective to be present;

a first preceding sentence objective presence judging unit for judging a presence or absence of an objective in the preceding sentence when said preceding sentence subjective presence judging unit has judged the subordinate clause to be absent;

a fourth supplementary word designating unit for designating a word corresponding to the objective as a supplemented word when said preceding sentence objective presence judging unit has judged the objective to be present;

a fifth supplementary word designating unit for designating a second personal pronoun as a supplemented word when said preceding sentence objective presence judging unit has judged the objective to be absent;

an object presence judging unit for judging a presence or absence of an object which agrees with the verb of the target language sentence;

a second principle clause presence judging unit for judging a presence or absence of a principle clause in the target language sentence when said object presence judging unit has judged the object to be absent;

a principle clause objective presence judging unit for judging a presence or absence of an objective in the principle clause when said principle clause presence judging unit has judged the principle clause to be present;

a sixth supplementary word designating unit for designating a word corresponding to the objective as a supplemented word when said principle clause objective presence judging unit has judged the objective to be present;

a second subordinate clause presence judging unit for judging a presence or absence of a subordinate clause in the target language sentence when said principle clause presence judging unit has judged the principle clause to be absent or when said principle clause objective presence judging unit has judged the object to be absent;

a subordinate clause objective presence judging unit for judging a presence or absence of an objective in the subordinate clause when said subordinate clause presence judging unit has judged the subordinate clause to be present;

a seventh supplementary word designating unit for designating a word corresponding to the objective as a supplemented word when said subordinate clause objective presence judging unit has judged the objective to be present;

a second preceding sentence objective presence judging unit for judging a presence or absence of an objective in the preceding sentence when said subordinate clause presence judging unit has judged the subordinate clause to be absent or when said subordinate clause objective presence judging unit has judged the objective to be absent;

an eighth supplementary word designating unit for designating a word corresponding to the objective as a supplemented word when said preceding sentence objective presence judging unit has judged the objective to be present;

a second preceding sentence objective presence judging unit for judging a presence or absence of a subjective in the preceding sentence when said preceding sentence objective presence judging unit has judged the objective to be absent;

a ninth supplementary word designating unit for designating a word corresponding to the subjective as a supplemented word when said preceding sentence subjective presence judging unit has judged the subjective to be present; and a tenth supplementary word designating unit for designating a demonstrative pronouns as a supplemented word when said preceding sentence subjective presence judging unit has judged the subjective to be absent.

10. The apparatus of claim 9, wherein said supplementary word storage means further comprises a supplementary word type data storage means for storing a type of a supplemented word when each of said first through tenth supplementary word designating units has designated the supplemented word.

11. The apparatus of claim 10, wherein said supplementary word display mode storage means comprises:

a subject mode storage unit for storing display mode information indicating that a subject has been supplemented when one of said first, second, third, fourth, and fifth supplementary word designating units has designated the supplemented word, in a case that said subject presence judging unit has judged the subject to be absent;

an object mode storage unit for storing display mode information indicating that an object has been supplemented when one of said sixth, seventh, eighth, ninth, and tenth supplementary word designating units has designated the supplemented word, in a case that said object presence judging unit has judged the object to be absent.

12. The apparatus of claim 11, wherein said display means comprises:

a supplementary word type data extract unit for extracting a type of a supplemented word from said supplementary word type data storage unit;

a corresponding display mode information extract unit for extracting a display mode information corresponding to the supplementary word type from said supplementary word display mode storage means; and a display unit for displaying a supplemented word in accordance with supplementary word display mode information.

13. The apparatus of claim 10, wherein said supplementary word display mode storage means comprises:

a principle clause mode storage unit for storing display mode information indicating that a word has been supplemented from a principle clause when one of said first supplementary word designating unit and sixth supplementary word designating unit has designated the supplemented word;

a subordinate clause mode storage unit for storing display mode information indicating that a word has been supplemented from a subordinate clause when one of said second supplementary word designating unit and said seventh supplementary word designating unit has designated the supplemented word;

a preceding sentence mode storage unit for storing display mode information indicating that a word has been supplemented from the preceding sentence when one of said third, fourth, eighth, and ninth supplementary word designating units has designated the supplemented word; and default mode storage unit for storing display mode information indicating that a word has been supplemented by default when one of said fifth and tenth supplementary word designating units has designated the supplemented word.

14. The apparatus of claim 13, wherein said display means comprises:

a supplementary word type data extract unit for extracting a type of a supplemented word from said supplementary word type data storage unit;

a corresponding display mode information extract unit for extracting a display mode information corresponding to the supplementary word type from said supplementary word display mode storage means; and a display unit for displaying a supplemented word in accordance with supplementary word display mode information.

15. An apparatus for translating a Japanese language sentence into a target language sentence, comprising:

a reception means for receiving a Japanese language sentence;

a Japanese analysis means for analyzing semantic structure of the Japanese language received by said reception means;

a transformation means for transforming the analyzed semantic structure to semantic structure of the target language by determining target language words equivalent to individual words composing the Japanese language sentence while, in case of need, supplementing a word that is omitted in the Japanese language sentence but is necessary in the target language so as to conform to grammar of the target language, the transformation means comprising:

a subject presence judging unit for judging a presence or absence of a subject which agrees with a verb of the target language sentence;

a first principle clause presence judging unit for judging a presence or absence of a principle clause in the target language sentence when said subject presence judging unit has judged the subject to be absent;

a principle clause subjective presence judging unit for judging a presence or absence of a subjective in the principle clause when said subject presence judging unit has judged the subject to be present;

a first supplementary word designating unit for designating a word corresponding to the subjective as a supplemented word when said principle clause subjective presence judging unit has judged the subjective to be present;

a first subordinate clause presence judging unit for judging a presence or absence of a subordinate clause in the target language sentence when said subject presence judging unit has judged the subject to be absent or when said principle clause subjective presence judging unit has judged the subject to be absent;

a subordinate clause subjective presence judging unit for judging a presence or absence of a subjective in the subordinate clause when said subordinate clause present judging unit has judged the subordinate clause to be present;

a second supplementary word designating unit for designating a word corresponding to the subjective as a supplemented word when said subordinate clause subjective presence judging unit has judged the subjective to be present;

a first preceding sentence subjective presence judging unit for judging a presence or absence of a subjective in a sentence immediately preceding the target language sentence when said subordinate clause presence judging unit has judged the subordinate clause to be absent or when said subordinate clause subjective presence judging unit has judged the subjective to be absent;

a third supplementary word designating unit for designating a word corresponding to the subjective as a supplemented word when said preceding sentence subjective presence judging unit has judged the subjective to be present;

a first preceding sentence objective presence judging unit for judging a presence or absence of an objective in the preceding sentence when said preceding sentence subjective presence judging unit has judged the subordinate clause to be absent;

a fourth supplementary word designating unit for designating a word corresponding to the objective as a supplemented word when said preceding sentence objective presence judging unit has judged the objective to be present;

a fifth supplementary word designating unit for designating a second personal pronoun as a supplemented word when said preceding sentence objective presence judging unit has judged the objective to be absent;

an object presence judging unit for judging a presence or absence of an object which agrees with the verb of the target language sentence;

a second principle clause presence judging unit for judging a presence or absence of a principle clause in the target language sentence when said object presence judging unit has judged the object to be absent;

a principle clause objective presence judging unit for judging a presence or absence of an objective in the principle clause when said principle clause presence judging unit has judged the principle clause to be present;

a sixth supplementary word designating unit for designating a word corresponding to the objective as a supplemented word when said principle clause objective presence judging unit has judged the objective to be present;

a second subordinate clause presence judging unit for judging a presence or absence of a subordinate clause in the target language sentence when said principle clause presence judging unit has judged the principle clause to be absent or when said principle clause objective presence judging unit has judged the object to be absent;

a subordinate clause objective presence judging unit for judging a presence or absence of an objective in the subordinate clause when said subordinate clause presence judging unit has judged the subordinate clause to be present;

a seventh supplementary word designating unit for designating a word corresponding to the objective as a supplemented word when said subordinate clause objective presence judging unit has judged the objective to be present;

a second preceding sentence objective presence judging unit for judging a presence or absence of an objective in the preceding sentence when said subordinate clause presence judging unit has judged the subordinate clause to be absent or when said subordinate clause objective presence judging unit has judged the objective to be absent;

an eighth supplementary word designating unit for designating a word corresponding to the objective as a supplemented word when said preceding sentence objective presence judging unit has judged the objective to be present;

a second preceding sentence objective presence judging unit for judging a presence or absence of a subjective in the preceding sentence when said preceding sentence objective presence judging unit has judged the objective to be absent;

a ninth supplementary word designating unit for designating a word corresponding to the subjective as a supplemented word when said preceding sentence subjective presence judging unit has judged the subjective to be present; and a tenth supplementary word designating unit for designating a demonstrative pronouns as a supplemented word when said preceding sentence subjective presence judging unit has judged the subjective to be absent;

a generation means for generating the target language sentence by rearranging the determined words of the target language into a phrase structure in conformance with the semantic structure of the target language found by said transformation means;

a supplementary word information storage means for storing information on the word supplemented by said transformation means, the supplementary word information storage means comprising a structure data storage unit for storing a position of the supplemented word in a semantic structure, and a display data storage unit for storing a display position of the supplemented word counted from a head position of the phrase structure generated by said target language sentence generation means;

a supplementary word display mode storage means for storing information on a display mode, said display mode being applied to the word supplemented so as to display the word in an appearance different from other words composing the target language sentence; and a display means for displaying the target language sentence generated by said generation means, wherein the word supplemented is displayed in the appearance different from the other words in accordance with said display mode.

16. The apparatus of claim 15, wherein said supplementary word storage means further comprises a supplementary word type data storage means for storing a type of a supplemented word when each of said first through tenth supplementary word designating units has designated the supplemented word.

17. The apparatus of claim 16, wherein said supplementary word display mode storage means comprises: a subject mode storage unit for storing display mode information indicating that a subject has been supplemented when one of said first, second, third, fourth, and fifth supplementary word designating units has designated the supplemented word, in a case that said subject presence judging unit has judged the subject to be absent; an object mode storage unit for storing display mode information indicating that an object has been supplemented when one of said sixth, seventh, eighth, ninth, and tenth supplementary word designating units has designated the supplemented word, in a case that said object presence judging unit has judged the object to be absent.

18. The apparatus of claim 17, wherein said display means comprises:

a supplementary word type data extract unit for extracting a type of a supplemented word from said supplementary word type data storage unit;

a corresponding display mode information extract unit for extracting a display mode information corresponding to the supplementary word type from said supplementary word display mode storage means; and a display unit for displaying a supplemented word in accordance with supplementary word display mode information.

19. The apparatus of claim 16, wherein said supplementary word display mode storage means comprises:

a subject mode storage unit for storing display mode information indicating that a word has been supplemented from a principle clause when one of said first supplementary word designating unit and sixth supplementary word designating unit has designated the supplemented word;

a subordinate clause mode storage unit for storing display mode information indicating that a word has been supplemented from a subordinate clause when one of said second supplementary word designating unit and said seventh supplementary word designating unit has designated the supplemented word;

a preceding sentence mode storage unit for storing display mode information indicating that a word has been supplemented from the preceding sentence when one of said third, fourth, eighth, and ninth supplementary word designating units has designated the supplemented word; and default mode storage unit for storing display mode information indicating that a word has been supplemented by default when one of said fifth and tenth supplementary word designating units has designated the supplemented word.

20. The apparatus of claim 19, wherein said display means comprises:

a supplementary word type data extract unit for extracting a type of a supplemented word from said supplementary word type data storage unit;

a corresponding display mode information extract unit for extracting a display mode information corresponding to the supplementary word type from said supplementary word display mode storage means; and a display unit for displaying a supplemented word in accordance with supplementary word display mode information.

* * * * *